US012222080B1

(12) United States Patent
Park et al.

(10) Patent No.: US 12,222,080 B1
(45) Date of Patent: Feb. 11, 2025

(54) COMMON CAVITY LIGHTING ASSEMBLY USING AUTO SHADING

(71) Applicant: GM GLOBAL TECHNOLOGY OPERATIONS LLC, Detroit, MI (US)

(72) Inventors: Jonglee Park, Novi, MI (US); Thomas S. Prevost, West Bloomfield, MI (US); Helgert Elezi, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/504,443

(22) Filed: Nov. 8, 2023

(51) Int. Cl.

| | |
|---|---|
| ***F21S 41/68*** | (2018.01) |
| ***F21S 41/20*** | (2018.01) |
| ***F21S 41/265*** | (2018.01) |
| ***F21S 41/40*** | (2018.01) |
| ***F21W 102/13*** | (2018.01) |

(52) U.S. Cl.
CPC ............ *F21S 41/68* (2018.01); *F21S 41/265* (2018.01); *F21S 41/285* (2018.01); *F21S 41/40* (2018.01); *F21W 2102/13* (2018.01)

(58) Field of Classification Search
CPC ........ F21S 41/68; F21S 41/265; F21S 41/285; F21S 41/40; F21W 2102/13
See application file for complete search history.

(56) References Cited

U.S. PATENT DOCUMENTS

| | | | | |
|---|---|---|---|---|
| 11,118,749 | B2 * | 9/2021 | Nykerk | F21S 43/33 |
| 2005/0128764 | A1 * | 6/2005 | Enders | F21S 41/645 362/509 |
| 2006/0250809 | A1 * | 11/2006 | Strazzanti | F21S 41/645 362/538 |
| 2014/0328078 | A1 * | 11/2014 | Williams | F21S 41/50 362/512 |
| 2022/0099269 | A1 * | 3/2022 | Park | G02F 1/157 |

* cited by examiner

*Primary Examiner* — Tsion Tumebo
(74) *Attorney, Agent, or Firm* — CANTOR COLBURN LLP

(57) ABSTRACT

Aspects of the disclosure include lighting assemblies and methods of using the same that leverage auto-shading laminates to support a common cavity for mixed lighting applications. An exemplary vehicle includes a lighting assembly having a common cavity. The common cavity includes an outer lens coated with an auto-shading film, a primary light source positioned behind the outer lens, a secondary light source positioned on an edge of the outer lens, and a wire embedded in the auto-shading film. The auto-shading film includes discrete substructures which vary in alignment in response to an electric field, thereby varying a transmittance through the outer lens. A controller is electrically coupled to the wire. The controller is configured to direct a switching voltage to a switch to change a state of the switch, thereby causing the wire to deliver the electric field to the discrete substructures to change the transmittance of the auto-shading film.

20 Claims, 6 Drawing Sheets

COMMON CAVITY LIGHTING ASSEMBLY USING AUTO SHADING

INTRODUCTION

The subject disclosure relates to lighting technologies, and particularly to leveraging auto-shading laminates to support a common cavity lighting assembly for low beam, high beam, positional lights, and signature lighting.

Vehicle lighting assemblies, or headlamp units, play a crucial role in ensuring road safety and visibility for both the driver and other road users. These assemblies include various lighting components, such as lenses and light sources, and can be configured as high beams, low beams, daytime running lamps (DRLs), positional lights (also referred to as parking lights, turn signals, etc.), fog lights, brake lights, and aesthetic or so-called signature lighting. These lighting components largely rely on distinct lenses and light sources to achieve their specific functions. For example, high beams typically employ a relatively high-powered projector, such as a halogen, xenon, or light emitting diode (LED) projector and a lens capable of transmitting a focused beam pattern, while the low beams rely on relatively lower power lighting sources and a lens that more evenly distributes light.

Auto-shading laminates, also known as variable transmittance, auto-dimming, or self-dimming glass panels, are advanced laminates that can dynamically adjust their level of transparency in response to a range of external factors, such as light intensity, temperature, and/or user preferences. By modulating the degree of transparency, variable transmittance glass panels can adjust the level of shading (e.g., auto-dimming) provided by the panel as desired. Variable transmittance glass panels have been applied to a range of applications across various industries, including automotive, architectural, and aerospace industries. These types of panels are particularly useful in applications such as windows, sunroofs, skylights, and architectural facades, where the amount of light and heat entering a space needs to be regulated for comfort, energy efficiency, and privacy.

SUMMARY

In one exemplary embodiment a vehicle includes a lighting assembly having a common cavity. The common cavity includes an outer lens coated with an auto-shading film, a primary light source positioned behind the outer lens, a secondary light source positioned on an edge of the outer lens, and a wire embedded in the auto-shading film. The auto-shading film includes discrete substructures which vary in alignment in response to an electric field, thereby varying a transmittance through the outer lens. A controller is electrically coupled to the wire. The controller is configured to direct a switching voltage to a switch to change a state of the switch, thereby causing the wire to deliver the electric field to the discrete substructures to change the transmittance of the auto-shading film.

In addition to one or more of the features described herein, in some embodiments, the auto-shading film has a first transmittance when the switch is in a first state and a second transmittance greater than the first transmittance when the switch is in a second state. In some embodiments, the controller is configured to direct the switch to the first state to support a call for low beams and to direct the switch to the second state to support a call for high beams.

In some embodiments, the common cavity includes a first lighting region and a second lighting region. In some embodiments, the second lighting region does not include the primary light source.

In some embodiments, the outer lens in the first lighting region comprises a transparent material and the outer lens in the second lighting region comprises a micro-lens material.

In some embodiments, the outer lens coated with the auto-shading film serves as a light guide for light emitted from the secondary light source. In some embodiments, the light guide reemits light from the secondary light source according to a total internal reflection.

In another exemplary embodiment a lighting assembly includes an outer lens coated with an auto-shading film. The auto-shading film includes discrete substructures which vary in alignment in response to an electric field, thereby varying a transmittance through the outer lens. The lighting assembly also includes a primary light source positioned behind the outer lens. The primary light source is configured to emit light through the auto-shading film and the outer lens. The light assembly includes a secondary light source positioned on an edge of the outer lens. The secondary light source is configured to emit light into the outer lens. The light assembly includes a wire embedded in the auto-shading film. The primary light source and the secondary light source are positioned within a common cavity of the lighting assembly.

In yet another exemplary embodiment a method can include coating an outer lens of a lighting assembly with an auto-shading film. The auto-shading film can include discrete substructures which vary in alignment in response to an electric field, thereby varying a transmittance through the outer lens. The auto-shading film can include a first transmittance when in a first state and a second transmittance greater than the first transmittance when in a second state. The method includes positioning a primary light source behind the outer lens. The primary light source is configured to emit light through the auto-shading film and the outer lens. The method includes positioning a secondary light source on an edge of the outer lens. The secondary light source is configured to emit light into the outer lens. The method includes embedding a wire in the auto-shading film and electrically coupling a controller to the wire. The controller is configured to direct a switching voltage to a switch to change a state of the switch, thereby causing the wire to deliver the electric field to the discrete substructures. The method includes receiving a call for high beams and, responsive to the call for high beams, switching the auto-shading film, via the controller, to the second state.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

and

Figure 6:
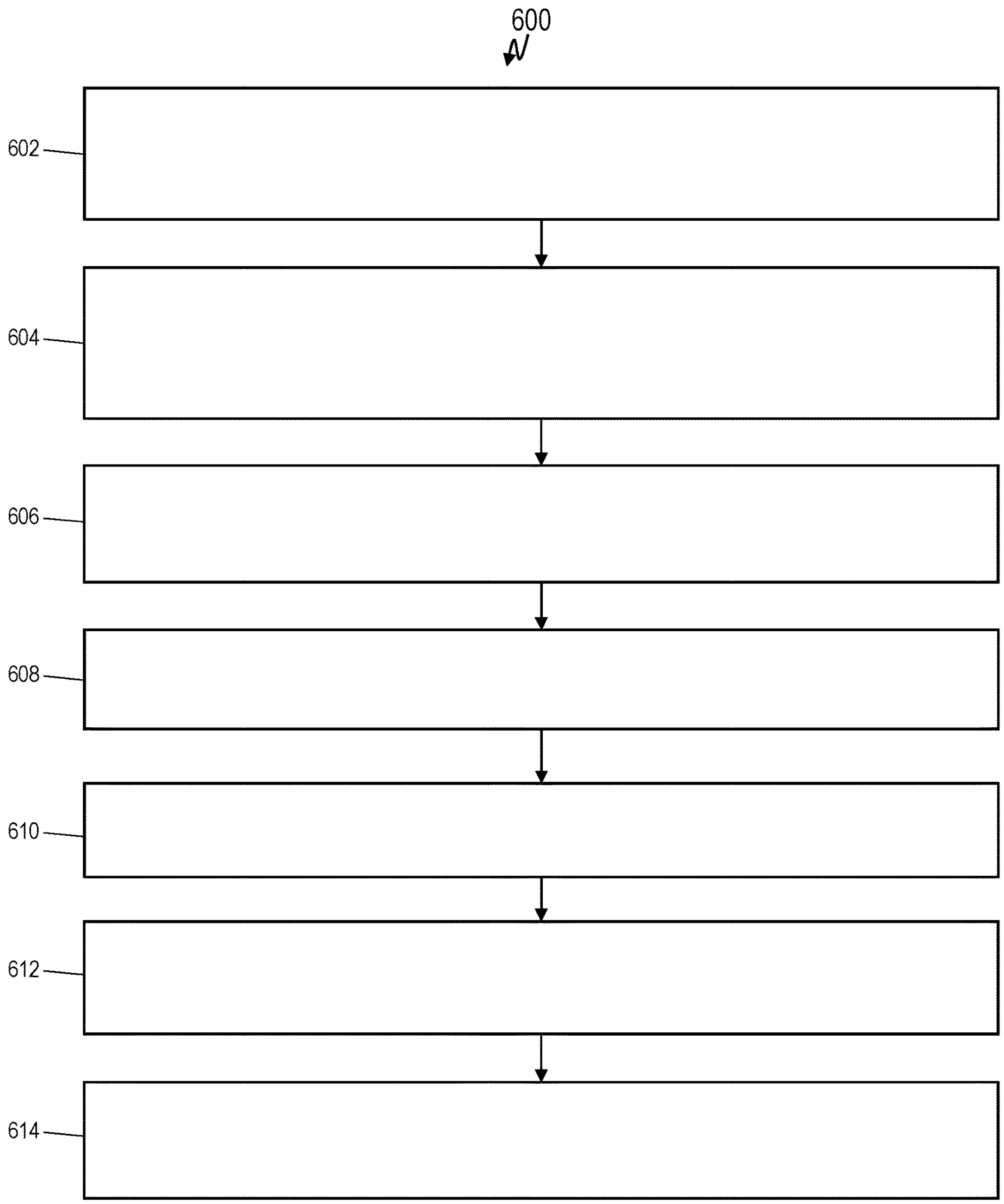

FIG. 6 is a flowchart in accordance with one or more embodiments.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Vehicle lighting assemblies, or head lamp units, play a crucial role in ensuring road safety and visibility for both the driver and other road users. These assemblies include various lighting components, such as lenses and light sources, and can be configured as high beams, low beams, daytime running lamps (DRLs), positional lights (also referred to as parking lights), turn signals, fog lights, brake lights, and aesthetic or so-called signature lighting. These lighting components largely rely on distinct lenses and light sources to achieve their specific functions.

Light sources are the fundamental components that emit light energy, such as incandescent bulbs, fluorescent tubes, LEDs (light-emitting diodes), halogen lamps, etc. Each light source type offers different color temperatures, energy efficiency levels, and lifespans, allowing lighting systems to be tailored to the specific needs of a given application.

Lenses, in the context of lighting systems, are optical elements designed to modify the behavior of light emitted from the light source. Lenses can be made from various materials, such as glass or plastics, and can control factors such as the angle of light dispersion, beam width, and focus. Lenses can be used to direct light in a specific direction, diffuse it for even illumination, and/or create visually appealing effects by refracting or reflecting light. When integrated with a light source in a lighting system, a lens can produce a range of lighting effects, such as focusing light in a specific area or scattering it for a more diffuse illumination (directionality), determining how wide or narrow the light distribution will be (beam control), alter the color temperature or color rendering properties of the light (color and color temperature control), as well as various specialized visual effects, such as a lens flare, halo effects, and/or light patterns.

As described previously, vehicle lighting assemblies can be configured with different lenses and light sources to serve a variety of purposes. Due to the differences in the lenses and light sources required to achieve the various functional and/or aesthetic requirements of a given lighting application (e.g., high beam vs. low beam vs. positional light, etc.), lighting assemblies configured for different purposes are typically configured within separate cavities (housings). Each cavity or housing will include the appropriate lenses and light sources for the respective lighting application. For example, the conventional way to provide low beam and high beam functions is to use separated cavities in the head lamp unit, each having a dedicated optical system to perform the required light output. Moreover, for the head beam (sometimes the low beam as well), a clear lens is selected to maximize light output. On the other hand, other lighting applications, such as DRLs and signature lighting (cosmetic lighting) often rely on frosted and/or tinted lenses to achieve a desired look.

Unfortunately, separated cavities and a combination of clear and frosted lenses do not necessarily meet the styling demands of consumers, particularly with respect to providing a seamless unlit or lit appearance. In short, the use of a clear lens means that the internally separated housings are externally visible and the interface between clear and frosted lenses means that a seamless effect is not possible.

This disclosure introduces a lighting assembly that leverages auto-shading laminates to support a common cavity for mixed lighting applications (e.g., low beam, high beam, positional lights, DRLs, signature lighting, etc.). As used herein, a "common cavity" refers to a single continuous cavity that encloses one or more optical and/or electrical components within a same physical volume (e.g., without air gaps, intermediate support walls, or other means of physical separation). In some embodiments, a clear outer lens of a common (combined) lighting assembly cavity is coated with an auto-shading film (ASF) made of auto-shading materials such as a polymer dispersed liquid crystal (PDLC) and/or electrochromic (EC) film. Auto-shading materials can change their light transmittance between partially or completely opaque (e.g., frosted) and transparent (e.g., clear) by applying a variable voltage.

In some embodiments, the ASF installed on the clear outer lens can be dynamically controlled depending on the required lighting situation. For example, in both an unlit status (e.g., vehicle is off, etc.) and a daytime lit status, the auto-shading material is off, resulting in a seamless, frosted appearance that customers will see across the entire lamp assembly. For a nighttime lit status, however, the auto-shading material is turned on in designated areas for low beams and/or high beams, resulting in a partially clear lens within the designated area, maximizing light from low beams and/or high beam projectors. The primary idea behind this approach is to provide a lighting assembly that appears frosted and/or wholly or partially opaque until a call for low beams and/or high beams is received. The result is a common lighting assembly that can natively meet both demands on styling (e.g., a seamless appearance) and required lighting functions (e.g., dedicated low beam and high beam functionality).

In some embodiments, the lighting assembly includes support for additional lighting elements, such as DRLs, positional lights, and/or signature lights, within the common cavity. In some embodiments, the lens material changes depending on the supporting lighting element. For example, in some embodiments, the lens is a clear lens coated with ASF in a first region to support a high/low beam, while the lens is made of a micro-lens material (also referred to as microoptics) such as a polymethyl methacrylate (PMMA) micro lens array (MLA) in a second region adjacent to the first region within the common cavity to support other lighting elements, such as DRLs, positional lights, and/or signature lights. Notably, microoptics such as PMMA MLAs have a similar "frosted" appearance to auto-shading materials such as PDLC when off and a uniform, seamless appearance can be maintained across the clear outer lens and the secondary lens. In another example, in some embodiments, an additional light source such as micro-LEDs can be positioned on an edge (sidewall) of the clear outer lens. The clear outer lens, in combination with the ASF coating, serves as a light guide for the additional light source. In short, the auto-shading material in the ASF acts as a reflective surface which can be used to exit light from the micro-LEDs via light guiding due to a total internal reflection (TIR) effect through the clear material of the outer lens. Moreover, these example embodiments can be combined as desired and all such combinations are within the contemplated scope of this disclosure.

Lighting assemblies constructed to leverage auto-shading laminates to support a common cavity across lighting applications in accordance with one or more embodiments offer several technical advantages over prior head lamp units. Notably, the ASF simultaneously serves two purposes. First, during the "day" mode (lit state during day), the ASF provides a reflective surface for any light sources positioned on an edge of the outer lens, allowing light from those sources to fully reflect out of the outer lens for daytime lighting and/or aesthetic purposes. Second, during the "night" mode (lit state during night and/or in any condition where the low beams and/or high beams are called), a voltage can be passed to the ASF to create a patterned, clear opening to direct a relatively high-powered low/high beam through the opening. Other advantageous are possible.

In particular, it should be noted that it is possible to precisely define the designated areas for the ASF, allowing for a range of functional and/or aesthetic designs and configurations. For example, while primarily discussed with respect to a rectangular opening, the shape of the opening in the "on" state can be changed as needed to direct the escaping light into any desired beam pattern. In addition, an animation effect can be performed by concurrently and/or sequentially by directing voltages to different cells in the ASF film (e.g., within the PDLC layer).

The ASF coating can be installed on an outer lens using an optical bonding and/or molding process. For example, the ASF can be placed into a laminate mold with a lens material, such as a polycarbonate (PC) material and/or acrylic material such as PMMA. A variable transmittance polymer laminate can then be formed using injection compression and/or standard injection molding processes at temperatures sufficient to create a polymer melt (also referred to as an overmolding process).

Figure 1:
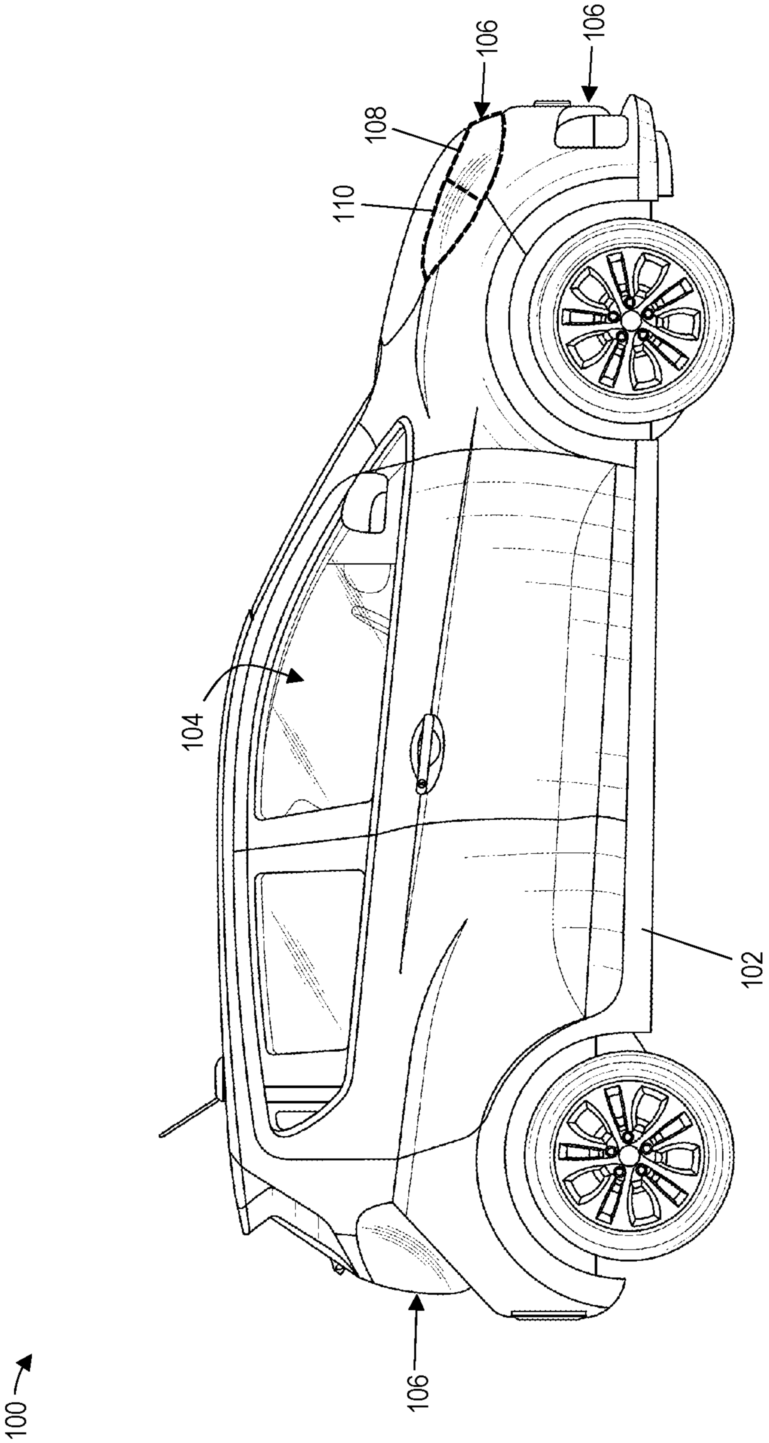
FIG. 1 is a vehicle configured in accordance with one or more embodiments.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Body 102 also includes a number of glass or polymer laminate lighting assemblies 106 (also referred to as lights or head lamps) housing a variety of lighting elements, such as, for example, front headlights, rear taillights, turn signals, reverse lights, decorative lighting, etc.

As will be detailed herein, one or more of the lighting assemblies 106 leverages auto-shading laminates to support a common cavity for mixed lighting applications. Auto-shading laminates are discussed in greater detail with respect to FIGS. 2A and 2B. In some embodiments, one or more of the lighting assemblies 106 includes a single cavity having a first lighting region 108 and a second lighting region 110. The first lighting region 108 and the second lighting region 110 are discussed in greater detail with respect to FIGS. 3A, 3B, 4A, and 4B.

The particular lighting assembly 106 emphasized in FIG. 1 (i.e., the front headlight) is emphasized only for ease of illustration and discussion. It should be understood that any aspect of the present disclosure can be applied to any of the lighting assemblies 106 in the vehicle 100. In additional, the location, size, arrangement, etc., of the lighting assemblies 106 and the shape, size, positioning, etc. of their elements (e.g., lenses) is not meant to be particularly limited, and all such configurations are within the contemplated scope of this disclosure.

Figure 2B:
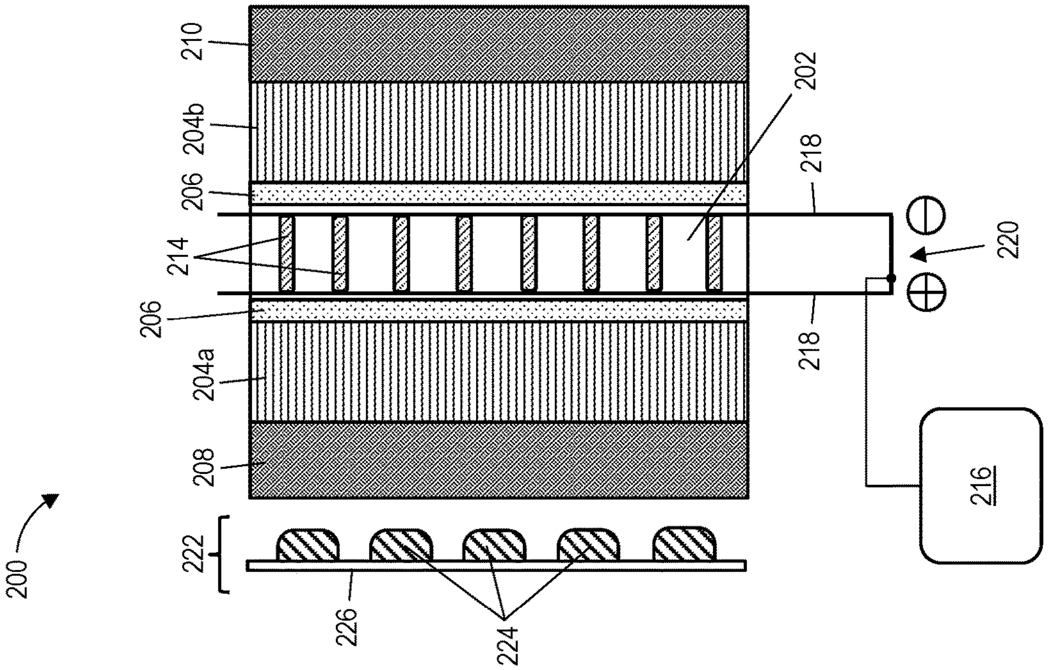
FIG. 2B is a cross-sectional view of the auto-shading laminate of FIG. 2A in a second state in accordance with one or more embodiments.
Figure 2A:
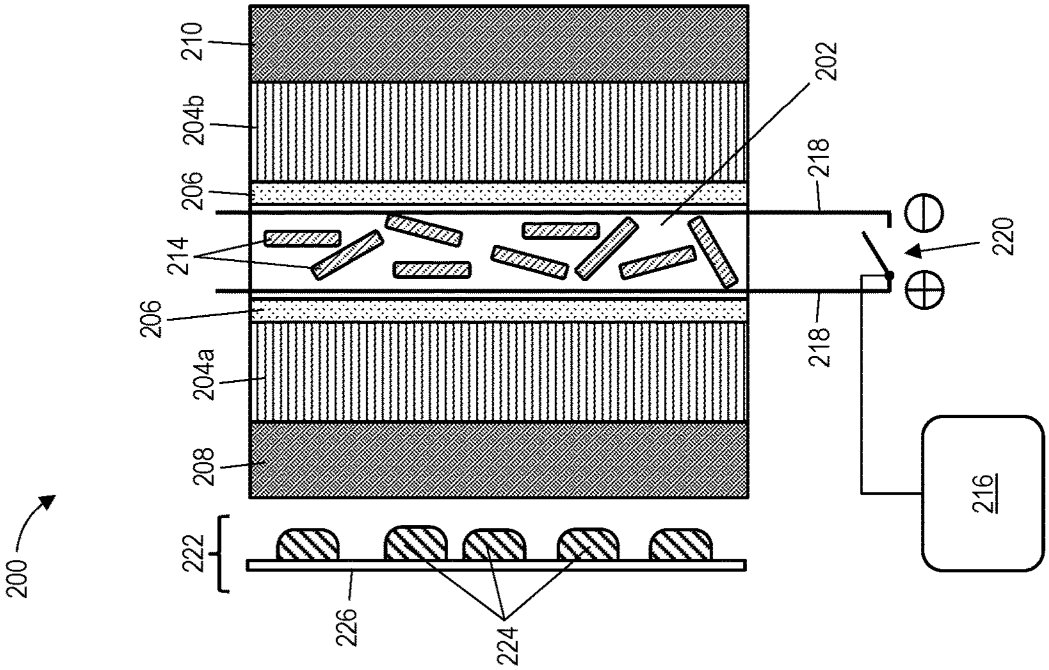
FIG. 2A is a cross-sectional view of an auto-shading laminate in a first state in accordance with one or more embodiments.

FIGS. 2A and 2B illustrate cross-sectional views of an auto-shading laminate 200 in accordance with one or more embodiments. The auto-shading laminate 200 can be incorporated within a lighting assembly of a vehicle (e.g., the lighting assemblies 106 of FIG. 1). FIG. 2A illustrates the auto-shading laminate 200 in a first state and FIG. 2B illustrates the auto-shading laminate 200 in a second state. In some embodiments, the first state is an opaque or frosted state (e.g., a relatively low transmittance state) and the second state is a clear state (e.g., a relatively high transmittance state).

As shown in FIGS. 2A and 2B, the auto-shading laminate 200 includes an auto-shading film 202 fixed between thermally conductive multi-layers 204*a* and 204*b*. The auto-shading film 202 can be made of any suitable material known for providing a variable, controllable transmittance, such as, for example, a polymer PDLC film, an EC film, and/or a tungsten oxide ($WO_3$) based film. Other auto-shading materials are possible and all such configurations are within the contemplated scope of this disclosure.

The thermally conductive multi-layers 204*a* and 204*b* can be made of the same, or different, layers. In some embodiments, the thermally conductive multi-layers 204*a* and 204*b* each include a thermal conductive layer. The thickness of the thermally conductive multi-layers 204*a* and 204*b* can vary as desired based on thermal threading performance. In some embodiments, the thickness of the thermally conductive multi-layers 204*a* and 204*b* is between 0.5 and 5.0 mm, although other thicknesses are within the contemplated scope of this disclosure. In some embodiments, the thermally conductive multi-layers 204*a* and 204*b* can be made of optically transparent or near transparent materials (transparency greater than 90 percent). In some embodiments, the thermally conductive multi-layers 204*a* and 204*b* are not transparent. For example, in some embodiments, the thermal conductive layer is made of a nontransparent material, such as, for example, carbon black and/or metal foil(s), and/or from relatively thicker layers which impede transparency. In some embodiments, the thermal conductive layer includes a graphene layer (k~3000 W/m-K), a single layer hexagonal boron nitride (h-BN) (k~550 W/m-K), aluminum oxide ($Al_2O_3$) (k~10 W/m-K), sapphire (k~1000 W/m-K), and/or indium tin oxide (k~2 W/m-K), although other materials are within the contemplated scope of this disclosure.

In some embodiments, a moisture barrier coating layer 206 is positioned between the auto-shading film 202 and the thermally conductive multi-layers 204*a* and 204*b*. The moisture barrier coating layer 206 can prevent condensation inside the auto-shading laminate 200 before, during, and after a molding process used to form/laminate the auto-shading laminate 200.

As further shown in FIGS. 2A and 2B, an inner lens layer 208 and an outer lens layer 210 are formed to cover opposite sides of the auto-shading film 202 and the thermally conductive multi-layers 204*a* and 204*b*. The inner lens layer 208 and the outer lens layer 210 can be, for example, the inner and outer surface layers, respectively, of a lens of the common lighting assembly 106 shown in FIG. 1.

The inner lens layer 208 and the outer lens layer 210 can be made of a range of suitable transparent polymers for overmolding. For example, in some embodiments, the inner lens layer 208 and the outer lens layer 210 are made of benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-transparent layers thereof, and combinations thereof. In certain aspects, the inner lens layer 208 and the outer lens layer 210 may be a thermoplastic transparent layer selected from the group consisting of: polyethylenimine (PEI), polyamide-imide (PAI), polyamide (PA) (e.g., nylon 6, nylon 66, nylon 12, nylon 11, nylon 6-3-T), polyetheretherketone (PEEK), polyetherketone (PEK), Polyvinyl Chloride (PVC), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), Styrene Methyl Methacrylate (SMMA), Methyl Methacrylate Acrylonitrile Butadiene Styrene (MABS), polycarbonate (PC), polyaryletherketone (PAEK), polyetherketoneketone (PEKK), co-transparent layers thereof, and combinations thereof.

In some embodiments, the auto-shading film 202 of the auto-shading laminate 200 includes discrete molecules and/or substructures 214 which vary in alignment and/or in optical properties in response to an applied electric current. The substructures 214 and/or the auto-shading film 202 can be made of electrochromic and/or liquid crystal materials.

In some embodiments, the substructures 214 include electrochromic pigments and/or materials that change in color and/or opacity in response to an applied voltage. In some embodiments, the substructures 214 include electrochromic pigments that undergo reversible electrochemical reactions when an electric current is passed through them. Depending on the voltage applied, the substructures 214 (e.g., molecules) either absorb or reflect light, altering the transparency of the auto-shading film 202.

In some embodiments, the substructures 214 include liquid crystal molecules that can change their alignment and/or optical properties when subjected to an electric field. By applying a voltage, the orientation of the liquid crystal molecules can be controlled, allowing the auto-shading film 202 to transition between transparent and opaque states by changing the applied voltage (or current).

In some embodiments, the transmittance (or opacity) of the auto-shading film 202 is controlled using an external control mechanism which includes a controller 216, wires 218, and a switch 220. In some embodiments, the controller 216 is configured to direct (or withhold) a switching current to (from) the switch 220. While not meant to be particularly limited, in some embodiments, the controller 216 can include, for example, an Electronic Control Unit (ECU) of a vehicle (e.g., the vehicle 100).

In some embodiments, the wires 218 are embedded within the auto-shading film 202 so that closing the switch 220 results in the application of a driving current to the substructures 214. The driving current can be provided via the controller 216 and/or via an external power source (not separately shown). In some embodiments, opening the switch 220 results in the substructures 214 being positioned in a random state (refer to FIG. 2A), while closing the switch 220 results in the substructure 214 being aligned to the resultant electric field (refer to FIG. 2B).

In some embodiments, positioning the substructures 214 randomly results in a low transmittance state, as light from a light source 222 will be wholly or partially deflected, absorbed, and reflected from the substructures 214. In some embodiments, aligning the substructures 214 with an applied electric field results in a high transmittance state, as light from a light source 222 will be free to pass between the substructures 214 and across the auto-shading film 202. FIG. 2A depicts the auto-shading film 202 and switch 220 in an open, low transmittance state, while FIG. 2B depicts the auto-shading film 202 and switch 220 in a closed, high transmittance state.

The light source 222 can be made of any suitable materials, such as, for example, incandescent bulbs, fluorescent tubes, LEDs (light-emitting diodes), halogen lamps, etc. In some embodiments, the light source 222 includes an array of LEDs 224 arranged on a substrate 226. The substrate 226 can include, for example, a backplane, although other configurations are within the contemplated scope of this disclosure.

While not meant to be particularly limited, configuring the auto-shading laminate 200 in this manner allows for the auto-shading laminate 200 to be leveraged within a variety of lighting applications. For example, during a "day" mode, a lighting assembly including the auto-shading laminate 200 can be set to maximum opacity (i.e., minimum transmittance) by opening the switch 220. In this state the lighting assembly visually blends into the surrounding materials to create a seamless look. On the other hand, during a "night" mode or during any period where the low beams and/or high beams are called, the switch 220 can be closed to transition the auto-shading film 202 to a maximum transmittance state to allow as much light as possible to exit the auto-shading laminate 200, enabling efficient emission of bright light to surrounding drivers and pedestrians.

Figure 3B:
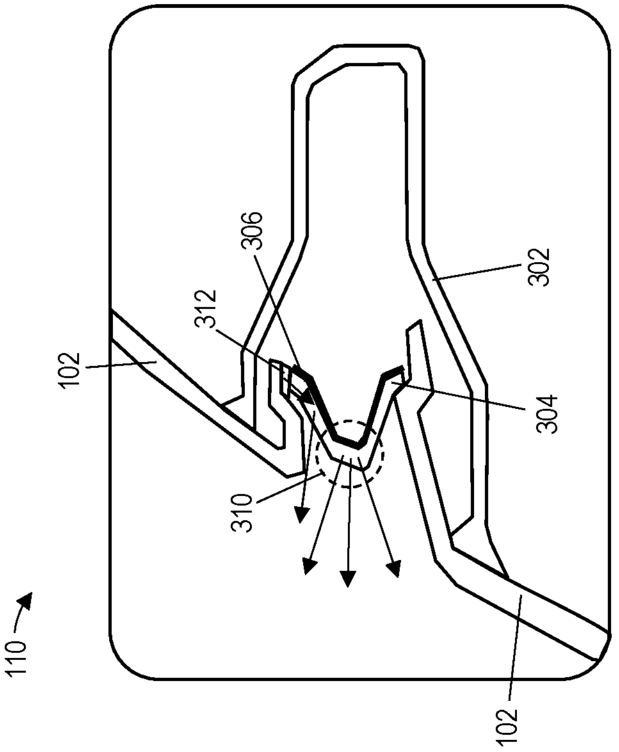
FIG. 3B is a cross-sectional view of a second lighting region of the lighting assembly shown in FIG. 1 in accordance with one or more embodiments.
Figure 3A:
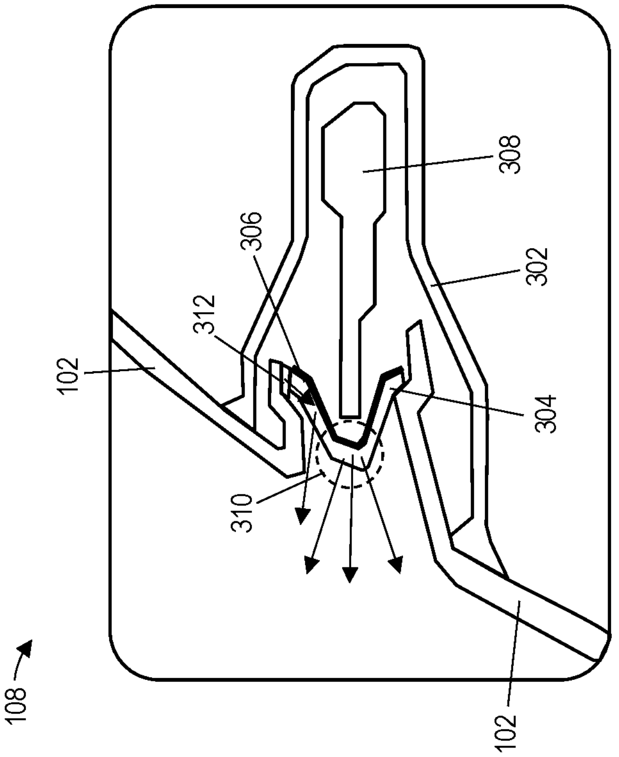
FIG. 3A is a cross-sectional view of a first lighting region of the lighting assembly shown in FIG. 1 in accordance with one or more embodiments.

FIGS. 3A and 3B illustrate cross-sectional views of the first lighting region 108 and the second lighting region 110, respectively, of the lighting assemblies 106 shown in FIG. 1 in accordance with one or more embodiments. In some embodiments, the first lighting region 108 is a high beam and/or low beam region. In some embodiments, the second lighting region 110 is a DRL, positional lighting, and/or signature lighting region. In some embodiments, the first lighting region 108 and the second lighting region 110 include a common cavity 302. In other words, the common cavity 302 spans the first lighting region 108 and the second lighting region 110.

As shown in FIG. 3A, in some embodiments, the first lighting region 108 includes an outer lens 304. The outer lens 304 can be made of a similar material and in a similar manner as the inner lens layer 208 and the outer lens layer 210 discussed previously with respect to FIGS. 2A and 2B. For example, the outer lens 304 can be a clear lens made of a transparent polymer such as PF and acrylic.

In some embodiments, the outer lens 304 is coated with an ASF 306. In some embodiments, the ASF 306 can include an auto-shading material(s) such as a polymer dispersed liquid crystal and/or electrochromic film that can vary in transmittance in response to a received voltage (refer FIGS. 2A and 2B).

In some embodiments, the outer lens 304 and the ASF 306 are positioned over a primary light source 308. In some embodiments, the primary light source 308 is a low beam and/or high beam projector, such as, for example, a halogen, xenon, or LED projector. In some embodiments, the primary light source 308 includes a first projector and a second projector (not separately shown). In some embodiments, the first projector is a relatively high power light source configured for service as a high beam and the second projector is a relatively low power light source configured for service as a low beam.

In some embodiments, the primary light source 308 is a relatively high power light source that serves, in combination with the outer lens 304 and the ASF 306, as both the high beam and the low beam. For example, the ASF 306 can be configured to change a designated area (refer to FIGS. 4A and 4B) from a wholly or partially opaque state to a partially or wholly transparent state responsive to a received voltage. In some embodiments, the ASF 306 changes a designated area to a partially transparent state having a first transmittance responsive to a call for low beams, and the ASF 306 changes the designated area to a relatively more (or fully) transparent state having a second transmittance greater than the first transmittance responsive to a call for high beams. In other words, while the primary light source 308 remains the same, an amount of light 310 emitted from the outer lens 304 can be adjusted by changing the transmittance through the ASF 306. In this manner a single primary light source 308 can serve as both the high beam and low beam light source.

In some embodiments, a secondary light source 312 is positioned on an edge and/or sidewall of the outer lens 304. In some embodiments, the secondary light source 312 is configured to output light into the outer lens 304. The secondary light source 312 can include, for example, LEDs, and/or micro LEDs, although other light sources are within the contemplated scope of this disclosure.

In some embodiments, the ASF 306 is made of a reflective material (e.g., PDLC) and coating the outer lens 304 with the ASF 306 causes the outer lens 304 to act as a light guide for the secondary light source 312. In some embodiments, the outer lens 304, in combination with the ASF 306, acts as a light guide having a total internal reflection (TIR) whereby all (or substantially all, e.g., greater than 95, 98, 99, 99.9 percent) of the light emitted from the secondary light source 312 will directly, or via reflection, exit the outer lens 304.

In some embodiments, the secondary light source 312 supports a different lighting function than the primary light source 308. For example, in some embodiments, the primary light source 308 is a low beam and/or high beam and the secondary light source 312 is a DRL, a positional light, and/or a signature (aesthetic and/or cosmetic light).

As shown in FIG. 3B, in some embodiments, the second lighting region 110 can be configured in largely the same manner as the first lighting region 108, except that the second lighting region 110 does not include the primary light source 308. For example, the second lighting region 110 can include the outer lens 304 made of a clear material, the ASF 306, and the secondary light source 312. In this configuration, the secondary light source 312 within the second lighting region 110 can support the same lighting function as described previously with respect to secondary light source 312 within the first lighting region 110.

In other embodiments, the outer lens 304 in the second lighting region 110 is not a clear lens coated with ASF, but is instead made of a micro-lens material such as a PMMA-based MLA (not separately shown). A micro-lens array consists of a number of relatively small lenses arranged in a grid-like pattern. These arrays are used in various optical devices and systems for tasks like beam shaping and light homogenization. Notably, micro-optics such as PMMA MLAs have a similar "frosted" appearance to auto-shading materials such as PDLC when the ASF is off and a uniform, seamless appearance can be maintained across the clear and micro-lens array portions of the outer lens 304 throughout the first lighting region 108 and the second lighting region 110.

Figure 4A:
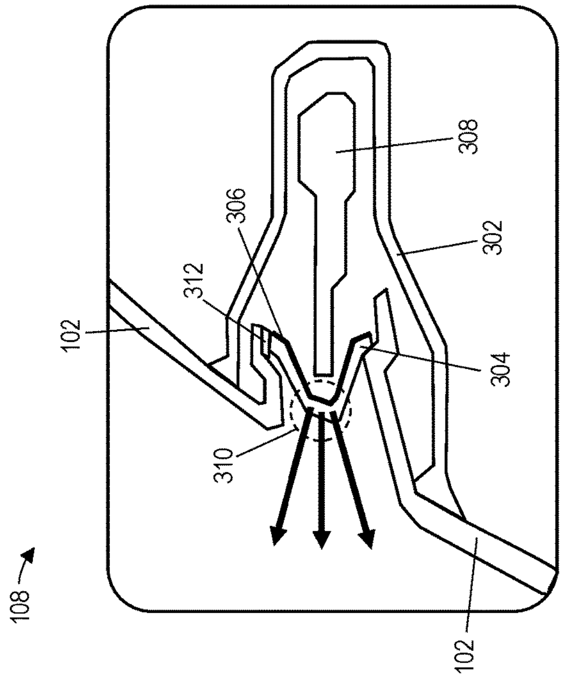
FIG. 4A is a cross-sectional view of the first lighting region shown in FIG. 3A after applying a voltage to an auto-shading film in accordance with one or more embodiments.
Figure 4B:
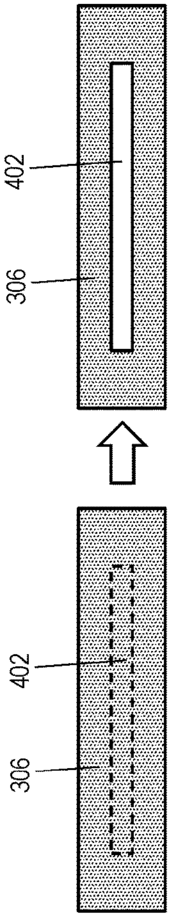
FIG. 4B is a view of the auto-shading film of FIG. 4A before and after application of a voltage in accordance with one or more embodiments.

FIG. 4A illustrates a cross-sectional view of the first lighting region 108 shown in FIG. 3A after applying a voltage to the ASF 306 in accordance with one or more embodiments. FIG. 4B illustrates a view of the ASF 306 before and after application of a voltage in accordance with one or more embodiments.

As shown in FIG. 4A, the amount of light 310 emitted from the outer lens 304 can be relatively higher than discussed with respect to FIG. 3A. In some embodiments, this increased light output is due, in part, to an adjusted transmittance of a portion of the ASF 306 (a so-called designated area 402). In some embodiments, the designated area 402 is configured to transition between a first, relatively low transmittance state (refer to left side of FIG. 4B) to a second, relatively high transmittance state (refer to right side of FIG. 4B) responsive to receiving a voltage (refer to FIGS. 2A and 2B).

Figure 4C:
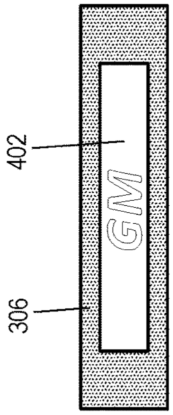
FIG. 4C is an example view of the auto-shading film of FIG. 4A after application of a voltage in accordance with one or more embodiments.

Observe that the designated area 402 is shown having a relatively rectangular shape for ease of illustration and convenience only. It should be understood that the designated area 402 can be arbitrarily patterned in shape, size, and/or orientation by directing different (or no) voltages to various segments (pixels, subpixels, etc.) of the ASF 306. Once such example pattern is shown in FIG. 4C.

Figure 5:
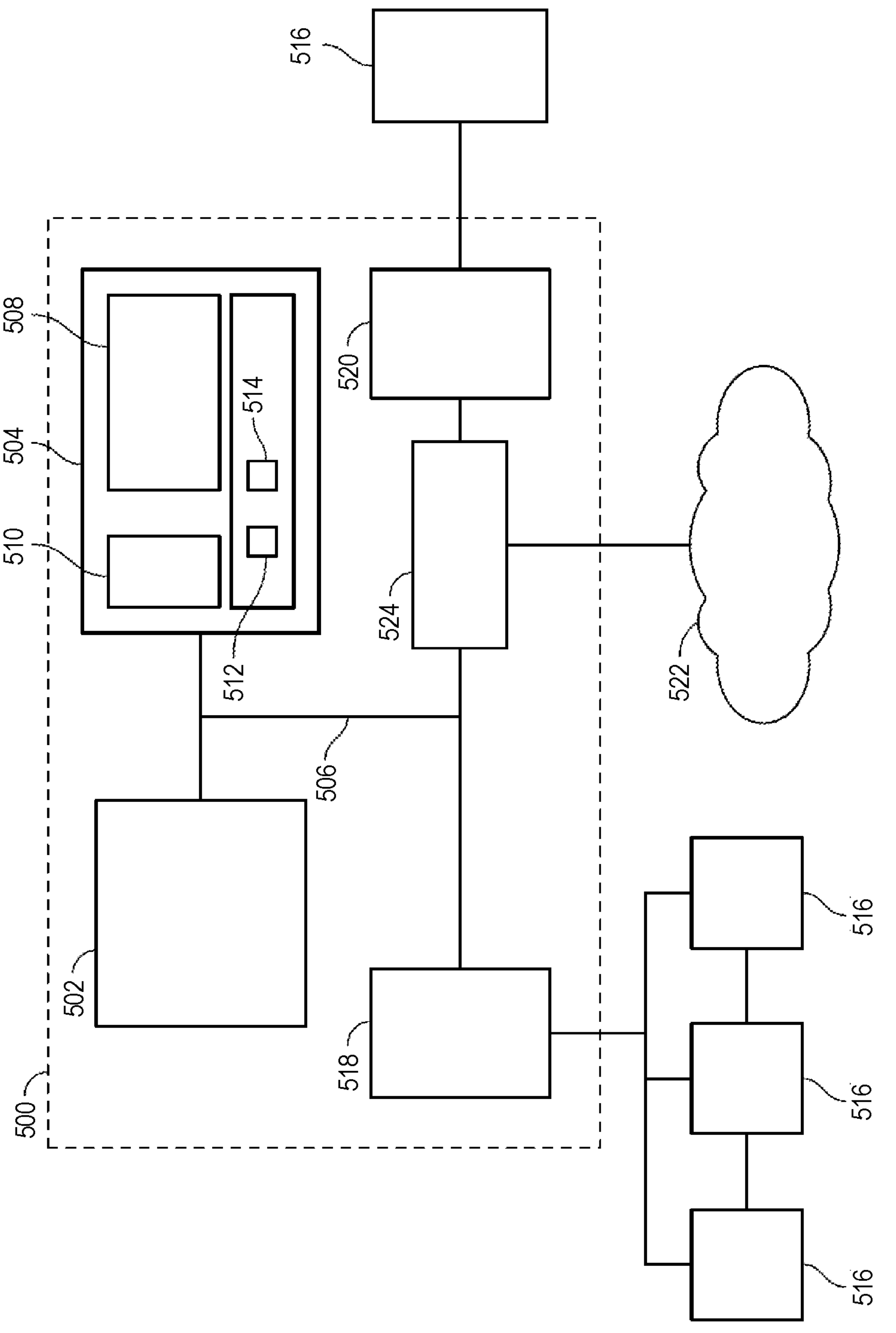
FIG. 5. is a computer system according to one or more embodiments.

FIG. 5 illustrates aspects of an embodiment of a computer system 500 that can perform various aspects of embodiments described herein. In some embodiments, the computer system 500 can be incorporated within or in combination with a controller (e.g., controller 216). The computer system 500 includes at least one processing device 502, which generally includes one or more processors for performing a variety of functions, such as, for example, controlling switching and/or driving voltages to the switch 220 and/or the wires 218. More specifically, the computer system 500 can include the logic necessary to adjust the transmittance of an auto-shading film (e.g., the ASF 202 and/or 306) via application of an electric current as described previously herein.

Components of the computer system 500 include the processing device 502 (such as one or more processors or processing units), a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media.

For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to control of the switch 220, the value of an applied voltage and/or current, etc. The computer system 500 is not so limited, as other modules may be included depending on the desired functionality of the respective displays. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 502 can also be configured to communicate with one or more external devices 516 such as, for example, a keyboard, a pointing device, and/or any devices (e.g., a network card, a modem, vehicle ECUs, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc. In some embodiments, the computer system 500 and/or the processing device 502 can receive information from one or more micro sensors (e.g., the sensor units 302), analyze said information, and send the information (raw, pre-processed, and/or post-processed) to one or more LEDs (e.g., the micro LEDs 210) and/or any other component of the vehicle 100.

Referring now to FIG. 6, a flowchart 600 for leveraging auto-shading laminates to support a common cavity lighting assembly for a range of lighting applications (e.g., low beam, high beam, positional lights, signature lighting, etc.) is generally shown according to an embodiment. The flowchart 600 is described in reference to FIGS. 1 to 5 and may include additional steps not depicted in FIG. 6. Although depicted in a particular order, the blocks depicted in FIG. 6 can be rearranged, subdivided, and/or combined.

At block 602, the method includes coating an outer lens of a lighting assembly with an auto-shading film. In some embodiments, the auto-shading film includes discrete substructures which vary in alignment in response to an electric field, thereby varying a transmittance through the outer lens. In some embodiments, the auto-shading film includes a first transmittance when in a first state and a second transmittance greater than the first transmittance when in a second state.

At block 604, the method includes positioning a primary light source behind the outer lens. In some embodiments, the primary light source is configured to emit light through the auto-shading film and the outer lens. In some embodiments, the primary light source is a high beam and/or low beam.

At block 606, the method includes positioning a secondary light source on an edge of the outer lens. In some embodiments, the secondary light source is configured to emit light into the outer lens. In some embodiments, the secondary light source is a DRL, positional light, and/or signature light.

At block 608, the method includes embedding a wire in the auto-shading film. At block 610, the method includes electrically coupling a controller to the wire. In some embodiments, the controller is configured to direct a switching voltage to a switch to change a state of the switch, thereby causing the wire to deliver the electric field to the discrete substructures.

At block 612, the method includes receiving a call for high beams. At block 614, the method includes, responsive to the call for high beams, switching the auto-shading film, via the controller, to the second state.

In some embodiments, the primary light source and the secondary light source are positioned within a common cavity of the lighting assembly. In some embodiments, the common cavity includes a first lighting region and a second lighting region.

In some embodiments, the second lighting region does not include the primary light source. In some embodiments, the outer lens in the first lighting region includes a transparent material and the outer lens in the second lighting region includes a micro-lens material.

In some embodiments, the outer lens coated with the auto-shading film serves as a light guide for light emitted from the secondary light source. In some embodiments, the light guide provides a total internal reflection for light emitted from the secondary light source.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

a lighting assembly comprising a common cavity, the common cavity comprising:

an outer lens coated with an auto-shading film, the auto-shading film comprising discrete substructures which vary in alignment in response to an electric field, thereby varying a transmittance through the outer lens;

a primary light source positioned behind the outer lens, the primary light source configured to emit light through the auto-shading film and the outer lens;

a secondary light source positioned on an edge sidewall of the outer lens, the secondary light source configured to emit light into the outer lens, wherein the outer lens and the auto-shading film collectively serve as a light guide for light emitted from the secondary light source into the outer lens; and a wire embedded in the auto-shading film; and a controller electrically coupled to the wire, the controller configured to direct a switching voltage to a switch to change a state of the switch, thereby causing the wire to deliver the electric field to the discrete substructures to change the transmittance of the auto-shading film.

2. The vehicle of claim 1, wherein the auto-shading film comprises a first transmittance when the switch is in a first state and a second transmittance greater than the first transmittance when the switch is in a second state, and wherein the controller is configured to direct the switch to the first state to support a call for low beams and to direct the switch to the second state to support a call for high beams.

3. The vehicle of claim 1, wherein the common cavity comprises a first lighting region and a second lighting region.

4. The vehicle of claim 3, wherein the second lighting region does not include the primary light source.

5. The vehicle of claim 3, wherein the outer lens in the first lighting region comprises a transparent material and the outer lens in the second lighting region comprises a micro-lens material.

6. The vehicle of claim 1, wherein the light guide comprises a total internal reflection.

7. The vehicle of claim 1, wherein the auto-shading film includes a designated region configured to transition between a first transmittance state and a second transmittance state different than the first transmittance state responsive to receiving the switching voltage.

8. A lighting assembly comprising:

an outer lens coated with an auto-shading film, the auto-shading film comprising discrete substructures which vary in alignment in response to an electric field, thereby varying a transmittance through the outer lens;

a primary light source positioned behind the outer lens, the primary light source configured to emit light through the auto-shading film and the outer lens;

a secondary light source positioned on an edge sidewall of the outer lens, the secondary light source configured to emit light into the outer lens, wherein the outer lens and the auto-shading film collectively serve as a light guide for light emitted from the secondary light source into the outer lens; and a wire embedded in the auto-shading film;

wherein the primary light source and the secondary light source are positioned within a common cavity of the lighting assembly.

9. The lighting assembly of claim 8, wherein the auto-shading film comprises a first transmittance when in a first state and a second transmittance greater than the first transmittance when is in a second state, and wherein a controller is configured to direct a switch to the first state to support a call for low beams and to direct the switch to the second state to support a call for high beams.

10. The lighting assembly of claim 8, wherein the common cavity comprises a first lighting region and a second lighting region.

11. The lighting assembly of claim 10, wherein the second lighting region does not include the primary light source.

12. The lighting assembly of claim 10, wherein the outer lens in the first lighting region comprises a transparent material and the outer lens in the second lighting region comprises a micro-lens material.

13. The lighting assembly of claim 8, wherein the light guide comprises a total internal reflection.

14. The lighting assembly of claim 8, wherein the auto-shading film includes a designated region configured to transition between a first transmittance state and a second transmittance state different than the first transmittance state responsive to receiving the switching voltage.

15. A method comprising:

coating an outer lens of a lighting assembly with an auto-shading film, the auto-shading film comprising discrete substructures which vary in alignment in response to an electric field, thereby varying a transmittance through the outer lens, wherein the auto-shading film comprises a first transmittance when in a first state and a second transmittance greater than the first transmittance when in a second state;

positioning a primary light source behind the outer lens, the primary light source configured to emit light through the auto-shading film and the outer lens;

positioning a secondary light source on an edge sidewall of the outer lens, the secondary light source configured to emit light into the outer lens, wherein the outer lens and the auto-shading film collectively serve as a light guide for light emitted from the secondary light source into the outer lens;

embedding a wire in the auto-shading film;

electrically coupling a controller to the wire, the controller configured to direct a switching voltage to a switch to change a state of the switch, thereby causing the wire to deliver the electric field to the discrete substructures;

receiving a call for high beams; and responsive to the call for high beams, switching the auto-shading film, via the controller, to the second state.

16. The method of claim 15, wherein the primary light source and the secondary light source are positioned within a common cavity of the lighting assembly, the common cavity comprising a first lighting region and a second lighting region.

17. The method of claim 16, wherein the second lighting region does not include the primary light source.

18. The method of claim 16, wherein the outer lens in the first lighting region comprises a transparent material and the outer lens in the second lighting region comprises a micro-lens material.

19. The method of claim 15, wherein the light guide comprises a total internal reflection.

20. The method of claim 15, wherein the auto-shading film includes a designated region configured to transition between the first transmittance and the second transmittance responsive to receiving the switching voltage.

* * * * *